(12) United States Patent
Singleton

(10) Patent No.: US 6,978,454 B2
(45) Date of Patent: Dec. 20, 2005

(54) CHECKING COMPUTER PROGRAM INSTALLATION

(75) Inventor: Richard Brian Singleton, Eaton Bray (GB)

(73) Assignee: McAfee, Inc., Santa Clara, CA (US)

(*) Notice: Subject to any disclaimer, the term of this patent is extended or adjusted under 35 U.S.C. 154(b) by 669 days.

(21) Appl. No.: 09/945,615

(22) Filed: Sep. 5, 2001

(65) Prior Publication Data

US 2003/0046679 A1 Mar. 6, 2003

(51) Int. Cl.[7] ............................................. G06F 9/445
(52) U.S. Cl. ...................................................... 717/175
(58) Field of Search ................................ 717/174–178

(56) References Cited

U.S. PATENT DOCUMENTS

| | | | |
|---|---|---|---|
| 5,758,154 A | 5/1998 | Quereshi .................... | 713/1 |
| 6,023,586 A | 2/2000 | Gaisford et al. ............ | 717/178 |
| 6,560,776 B1 * | 5/2003 | Breggin et al. ............. | 717/176 |

OTHER PUBLICATIONS

W. Du et al, "Security Relevancy Analysis on the Registry of Windows NT 4.0" Proceedings 15th Annual, IEEE Comput. Soc., Dec. 1999.
I. Pakalski et al, "Wenn Windows Wurmt" *Computer Technology*, No. 26, 1999, pp. 102-107.

* cited by examiner

Primary Examiner—Anil Khatri
Assistant Examiner—Trenton J. Roche
(74) Attorney, Agent, or Firm—Zilka-Kotab, PC; Christopher J. Hamaty

(57) ABSTRACT

A computer program tool for checking the correct or otherwise installation of a different computer program operates by comparing predetermined installation data with detected installation results, including at least one of read register entries and details of files stored subsequent to the installation. A user may specify the particular computer program and version of which the installation is to be checked, as well the operating system environment. The results of the checking may be reported as a simple pass/fail, a code value or a descriptive text of any error encountered.

18 Claims, 4 Drawing Sheets

REGISTRY TEMPLATE

AV LOCATION = *

ENGINE LOCATION = [ AV LOCATION ] \ ENGINE

DAT LOCATION = [ AV LOCATION ] \ DAT

FILE DETAILS TEMPLATE

AV LOCATION
{ FILE 1 } — — — — — — → FILENAME, SIZE, TIME/DATE STAMP PROPERTIES, ......
{ FILE 2 }

ENGINE LOCATION
{ FILE 3 }

DAT LOCATION
{ FILE 4 }
{ FILE 5 }
{ FILE 6 }

FIG. 3

– 1 –
CHECKING COMPUTER PROGRAM INSTALLATION

BACKGROUND OF THE INVENTION

1. Field of the Invention

This invention relates to the field of data processing systems. More particularly, this invention relates to the installation of computer programs upon computers.

2. Description of the Prior Art

As computer systems become more sophisticated and complex, the number of installed computer programs on a computer system is generally increasing. Furthermore, the number of configuration parameters associated with a computer system is also generally increasing. When a new computer program is installed upon a computer system there are a large number of factors which can influence how it is installed. As examples, the operating system of the computer system upon which the computer program is to be installed may influence the selection of the files to be installed or a user may specify a particular location to which the computer program is to be installed that is specific to the computer in question. There are many further parameters, often unknown to an ordinary user, which control in detail how an application is installed.

Whilst some computer program providers, often in conjunction with operating system providers, supply tools and mechanisms to assist in the installation of their computer programs, such as automatic installs, these are not always successful. In particular, the large number of variables associated with the configuration of a particular computer may mean that whilst an installation appears to complete successfully, there are in fact mistakes/problems in that installation. Whilst known mechanisms for automatically installing computer programs provide mechanisms for repairing an installation, these simply re-install the computer program in the same way as it was initially installed and so are highly likely to encounter the same mistakes/problems that were associated with the initial installation. In these circumstances, a considerable problem exists in identifying and overcoming incorrect installation. In particularly, if an installation appears to have been completed incorrectly, then the non-operation of the associated computer program may be considered to result from other surrounding factors and a great deal of time can be wasted in seeking to identify such factors before what initially appeared to be a correct installation is investigated as a potential cause of the problems. Furthermore, considerable detailed specialist knowledge may be required to identify whether or not an installation has completed successfully due to the increasing number and complexity of the files stored and parameters set when a typical computer program is installed.

SUMMARY OF THE INVENTION

Viewed from one aspect the present invention provides a computer program product operable to control a computer to check installation of a computer program upon said computer, said computer program product comprising:

reading logic operable to read predetermined installation data characterising correct installation of said computer program;

detection result generation logic operable to generate a detection result by detecting upon said computer at least one of (i) one or more registry entries within an operating system registry of said computer made upon installation of said computer program; and (ii) one or more files store upon said computer upon installation of said computer program; and comparison result generation logic operable to generate a comparison result by comparing said detection result with said predetermined installation data to check correct installation of said computer program.

The invention provides a specific tool to check the installation of a computer program by examining at least one of the registry entries made or the files stored upon installation. This tool does not seek to reinstall (repair) the computer program, but instead examines the results of an installation that has already been made in comparison with data defining what those results should be for a correct installation and accordingly identifies whether or not a correct installation has taken place. The invention recognises that in many cases an installation may appear to have been completed successfully, but there can be problems with that installation and a specific tool to directly compare the actual results of the installation with the desired results is strongly beneficial.

The predetermined installation data can take a wide variety of forms. In particularly preferred embodiments the predetermined installation data can specify one or more relationships between registry entries corresponding to correct installation. As well as required registry entries being added to the registry, in many cases it is important that they should have particular relationships and accordingly the predetermined installation data can enable this to be checked. Further preferred content of the predetermined installation data includes specification of which files should be found at which locations for a correct installation as well as characteristics of those files such as filename, file size, time/date stamp, access properties, etc.

It will be appreciated from the above discussion of the general problem that the particular form of an installation can vary depending upon the circumstances. In order to cater for this to at least some degree preferred embodiments provide that a user should give user input that specifies a set of predetermined installation data to be used. Thus, a user can select a particular computer program product, computer program product version, operating system environment etc which can then be mapped to an appropriate characterising set of predetermined installation data.

If incorrect installation is detected, then a simple pass/fail result could be returned to the user. However, in preferred embodiments a code or description of how the computer program is incorrectly installed may be returned to the user. A code could be reported to a customer support service for the computer program and decoded by them in order that they may recommend appropriate corrective action. Coding the faults in this way may help to preserve the secrecy of security critical computer programs, such as anti-virus computer programs. Conversely, if a particular incorrect installation has a cause that may be publicly explained to a user without impacting the security of the computer program, then a description of that cause may be generated that could assist the user in correcting the problem themselves without being forced to contact the customer support services.

Viewed from further aspects the invention also provides a method for checking correct installation and an apparatus for checking correct installation.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3 schematically illustrates an example of predetermined installation data.

DESCRIPTION OF THE PREFERRED EMBODIMENTS

Figure 1:
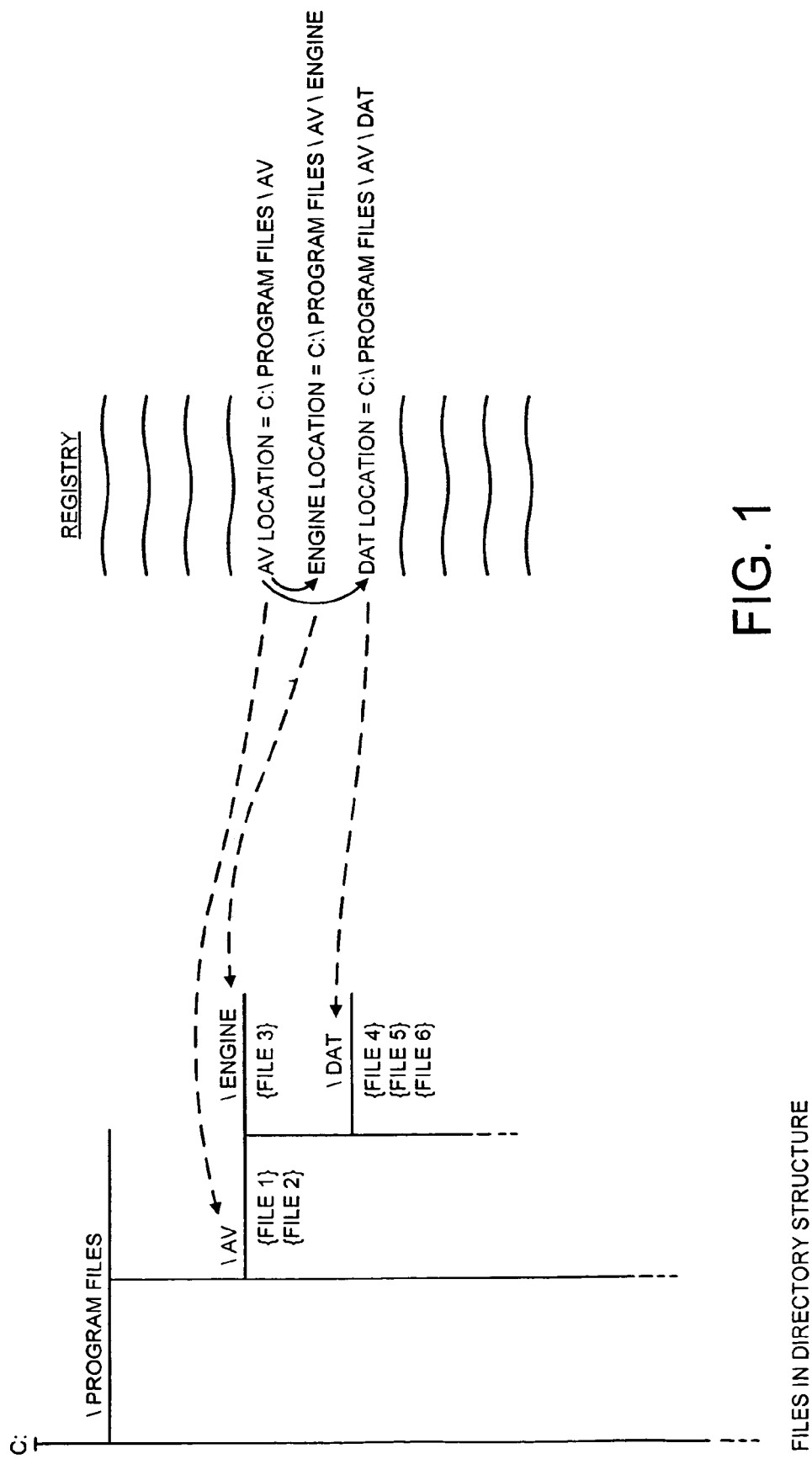
FIG. 1 schematically illustrates files stored in a directory structure and associated register entries corresponding to a program installation.

FIG. 1 schematically illustrates computer files installed and register entries made as a consequence of the installation of a computer program. In this example, the computer program being installed is an anti-virus computer program (AV) with the installation target being a computer running the Windows Operating System produced by Microsoft Corporation and including an operating system registry. In accordance with known techniques the registry includes a number of entries specifying parameters relating to the installed computer program. In this simplified example, the parameters specified are the location of the main computer files of the root directory for this computer program installation together with pointers to the location of further portions of the computer program, such as the anti-virus engine executable files and the virus defining data.

It will be seen that in accordance with the usual arrangement within such systems the anti-virus program is stored within a directory AV that is itself a subdirectory of the Program Files directory of the C: drive. The anti-virus engine executable file is located for a correct installation in a subdirectory Engine of the AV directory and the virus definition data is similarly executed in its own subdirectory DAT of the AV directory. The anti-virus computer program requires this relationship between the AV directory and the associated Engine subdirectory and the DAT subdirectory.

It will be appreciated that the location to which the computer program is installed at the level of the AV directory may be user specified and a particular user may not follow the usual convention of placing this directory within the C:/ProgramFiles directory. Accordingly, the registry entries are needed to specify the actual locations of the portions of the computer program when it is installed. As the computer program assumes certain relationships between the locations of different components from which it is formed, these relationships must be properly specified in the registry for a correct installation. Furthermore, a correct installation will require the correct versions of the correct files to be installed at the appropriate relative locations.

Figure 2:
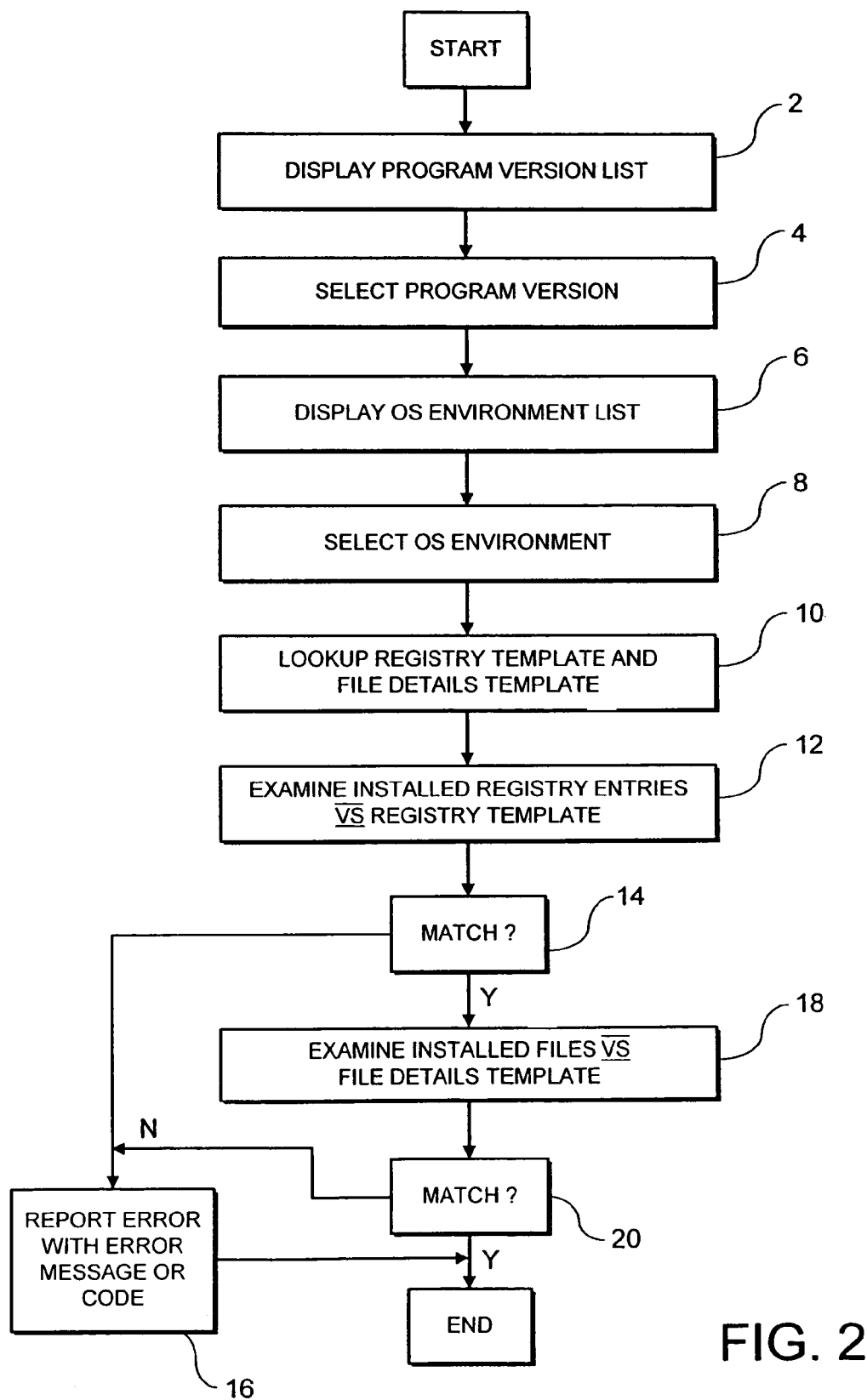
FIG. 2 is a flow diagram illustrating the processing flow for a tool for checking an installation.

FIG. 2 is a flow diagram schematically illustrating the processing performed by the installation checking tool. At step 2 the user is displayed a list of computer program versions from which they may select at step 4. As an example, the tool may be used to check correct installation of a plurality of different computer programs, a plurality of versions of the same computer program or perhaps a particular computer program patched to one of several service pack levels that have an influence upon what registry entries should be made and what files should be stored in particular locations.

At step 6 a list of operating system environments to which the selected program is to be installed is also displayed to a user for selection at step 8. The operating system environment to which a particular computer program is to be installed will have a considerable influence upon which computer files are copied to the computer in question, the relationship between those computer files and any registry entries that need to be made.

At step 10 the predetermined installation data selected in dependence upon the selections at steps 4 and 8 is read from among a plurality of sets of such data. This predetermined installation data specifies a template for the register entries that correspond to a correct installation and a template for the file details corresponding to a correct installation.

At step 12 the register entries within the computer system upon which the tool is being run are compared with the registry template read at step 10. Step 14 tests for a match between the register entries read and the registry template. If a match does not occur, then processing proceeds to step 16 at which a message reporting the incorrect installation is generated for display to a user. This message may be a simple pass/fail indication such as a green or read traffic signal. Alternatively, a code value corresponding to the nature of the registry mis-match may be generated for reporting to a customer services organisation such that they may look up the nature of the mis-match and instruct the user as to appropriate remedies. The user message may also include a plain language description of the mis-match or other error so as to enable the user to rectify the problem themselves.

If the test at step 14 indicated that the actual register entries and the registry templates matched, then processing proceeds to step 18 at which a comparison is made between the installed files of the computer program and the file details template. The file details template can include details of the filenames of the files that should be present for a correct installation, as well as confirmatory details such as the file size, time/date stamp and access properties of those files. Step 20 then tests for a match between the installed files and the file details template. If these match, then processing terminates. If these do not match, then processing proceeds to step 16 where a user message is generated in a similar way as for a registry mis-match, but in this case giving code or description details relating to the file mis-match detected. After the user message generated at step 16, processing terminates.

FIG. 3 schematically illustrates a set of predetermined installation data. The Registry Template data checks that there is a registry entry specifying a storage location for the AV program at its root level. The Registry Template further specifies that the Registry should include an entry for the Engine location and the DAT location that have specified relative locations compared to the root AV location that may be read from the actual installed registry.

In practice it will be appreciated that many more registry entries are made upon a computer program installation and details of these registry entries may be specified within the Registry Template for checking.

The predetermined installation data also includes a File Details Template. For each location of files as specified in the registry, a list of the particular files that should be found at that location for a correct installation is specified. The files are specified by their filename and optionally include specification of their size, time/date stamp, access properties etc to ensure that precisely the correct file is present with the correct setup. It will be seen in this example that the locations of the files are determined from the registry which is checked for correct configuration and to determine user specified parameters prior to checking the file details.

The installation checking tool discussed above may be run as an independent entity should a user suspect that an installation has not been completed correctly. Alternatively, the installation checking tool may be automatically triggered to be run after an automated installation or at least the option of running the checking tool given to a user after an automated installation.

The above examples relate to a particular computer program in a particular operating system and computer system environment. It will however be appreciated that the technique of checking for a correct installation by examining the results of that installation is more generally applicable to a wide variety of computer programs and operating system and computer environments.

Figure 4:
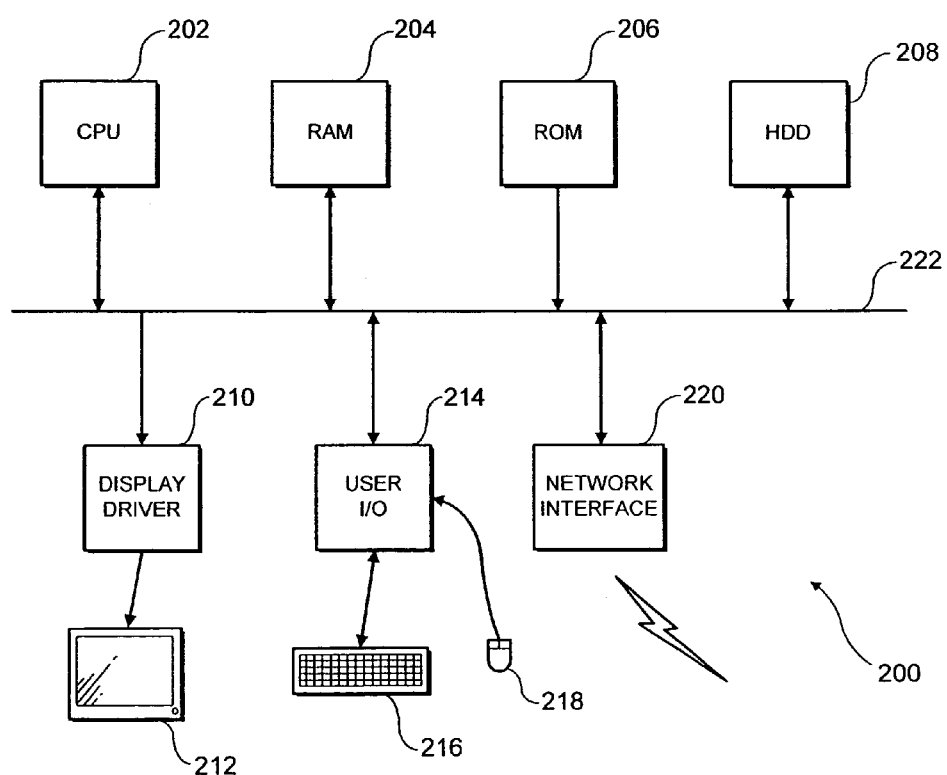
FIG. 4 schematically illustrates a general purpose computer of the type that may be used to implement the above described techniques.

FIG. 4 schematically illustrates a general purpose computer 200 of the type that may be used to implement the above techniques. The general purpose computer 200 includes a central processing unit 202, a random access memory 204, a read only memory 206, a hard disk drive 208, a display driver 210 and display 212, a user input/output circuit 214 and keyboard 216 and mouse 218 and a network interface unit 220 all connected via a common bus 222. In operation the central processing unit 202 executes program instructions stored within the random access memory 204, the read only memory 206 or the hard disk drive 208. The working memory is provided by the random access memory 204. The program instructions could take a variety of forms depending on the precise nature of the computer 200 and the programming language being used. The results of the processing are displayed to a user upon the display 212 driven by the display driver 210. User inputs for controlling the general purpose computer 200 are received from the keyboard 216 and the mouse 218 via the user input/output circuit 214. Communication with other computers, such as exchanging e-mails, downloading files or providing internet or other network access, is achieved via the network interface unit 220.

It will be appreciated that the general purpose computer 200 operating under control of a suitable computer program may perform the above described techniques and provide apparatus for performing the various tasks described. The general purpose computer 200 also executes the method described previously. The computer program product could take the form of a recordable medium bearing the computer program, such as a floppy disk, a compact disk or other recordable medium. Alternatively, the computer program could be dynamically downloaded via the network interface unit 220.

It will be appreciated that the general purpose computer 200 is only one example of the type of computer architecture that may be employed to carry out the above described techniques. Alternative architectures are envisaged and are capable of use with the above described techniques.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A computer program product operable to control a computer to check installation of a computer program upon said computer, said computer program product comprising:
reading logic operable to read predetermined installation data characterising correct installation of said computer program;
detection result generation logic operable to generate a detection result by detecting upon said computer at least one of
(i) one or more registry entries within an operating system registry of said computer made upon installation of said computer program; and
(ii) one or more files store upon said computer upon installation of said computer program; and
comparison result generation logic operable to generate a comparison result by comparing said detection result with said predetermined installation data to check correct installation of said computer program, wherein said predetermined installation data specifies at least one relationship between registry entries corresponding to correct installation of said computer program.

2. A computer program product as claimed in claim 1, wherein said predetermined installation data specifies one or more files to be found at specified locations corresponding to correct installation of said computer program.

3. A computer program product as claimed in claim 1, wherein said predetermined installation data specifies one or more of file name, file size, time/data stamp and access properties of files corresponding to correct installation of said computer program.

4. A computer program product as claimed in claim 1, further comprising selection logic operable in response to a user input to select a set of predetermined installation data for use from among a plurality of sets of predetermined installation data.

5. A computer program product as claimed in claim 4, wherein said user input specifies one or more of a computer program product, a computer program product version and an operating system of said computer.

6. A computer program product as claimed in claim 1, further comprising user message generating logic operable in response said comparison result indicating incorrect installation of said computer program to generate a user message including one or more of a code indicative of how said computer program is incorrectly installed and a description indicative of how said computer program is incorrectly installed.

7. A method of checking installation of a computer program upon a computer, said method comprising the steps of:
reading predetermined installation data characterising correct installation of said computer program;
generating a detection result by detecting upon said computer at least one of
(i) one or more registry entries within an operating system registry of said computer made upon installation of said computer program; and
(ii) one or more files store upon said computer upon installation of said computer program; and
generating a comparison result by comparing said detection result with said predetermined installation data to check correct installation of said computer program, wherein said predetermined installation data specifies at least one relationship between registry entries corresponding to correct installation of said computer program.

8. A method as claimed in claim 7, wherein said predetermined installation data specifies one or more files to be found at specified locations corresponding to correct installation of said computer program.

9. A method as claimed in claim 7, wherein said predetermined installation data specifies one or more of file name, file size, time/data stamp and access properties of files corresponding to correct installation of said computer program.

10. A method as claimed in claim 7, further comprising, in response to a user input, selecting a set of predetermined installation data for use from among a plurality of sets of predetermined installation data.

11. A method as claimed in claim 10, wherein said user input specifies one or more of a computer program product, a computer program product version and an operating system of said computer.

12. A method as claimed in claim 7, further comprising, in response said comparison result indicating incorrect installation of said computer program, generating a user message including one or more of a code indicative of how said computer program is incorrectly installed and a description indicative of how said computer program is incorrectly installed.

13. Apparatus for checking installation of a computer program upon a computer, said apparatus comprising:
   a data reader operable to read predetermined installation data characterising correct installation of said computer program;
   a detection result generator operable to generate a detection result by detecting upon said computer at least one of
   (i) one or more registry entries within an operating system registry of said computer made upon installation of said computer program; and
   (ii) one or more files store upon said computer upon installation of said computer program; and
   a comparison result generator operable to generate a comparison result by comparing said detection result with said predetermined installation data to check correct installation of said computer program, wherein said predetermined installation data specifies at least one relationship between registry entries corresponding to correct installation of said computer program.

14. Apparatus as claimed in claim 13, wherein said predetermined installation data specifies one or more files to be found at specified locations corresponding to correct installation of said computer program.

15. Apparatus as claimed in claim 13, wherein said predetermined installation data specifies one or more of file name, file size, time/data stamp and access properties of files corresponding to correct installation of said computer program.

16. Apparatus as claimed in claim 13, further comprising a data selector operable in response to a user input to select a set of predetermined installation data for use from among a plurality of sets of predetermined installation data.

17. Apparatus as claimed in claim 16, wherein said user input specifies one or more of a computer program product, a computer program product version and an operating system of said computer.

18. Apparatus as claimed in claim 13, further comprising user message generating logic operable in response said comparison result indicating incorrect installation of said computer program to generate a user message including one or more of a code indicative of how said computer program is incorrectly installed and a description indicative of how said computer program is incorrectly installed.

* * * * *